(12) United States Patent
Sugahara

(10) Patent No.: US 10,642,544 B2
(45) Date of Patent: May 5, 2020

(54) IMAGE FORMING APPARATUS CAPABLE OF UNDERGOING REMOTE IMAGE DIAGNOSIS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Asako Sugahara, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/203,281

(22) Filed: Nov. 28, 2018

(65) Prior Publication Data
US 2019/0163418 A1 May 30, 2019

(30) Foreign Application Priority Data
Nov. 29, 2017 (JP) .................................. 2017-228942

(51) Int. Cl.
*G06F 3/12* (2006.01)
*G03G 15/00* (2006.01)
*H04N 1/00* (2006.01)

(52) U.S. Cl.
CPC ....... *G06F 3/1218* (2013.01); *G03G 15/5062* (2013.01); *G03G 15/55* (2013.01); *G06F 3/1285* (2013.01); *H04N 1/00005* (2013.01); *H04N 1/00015* (2013.01); *H04N 1/00029* (2013.01); *H04N 1/00039* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 4,805,033 A * | 2/1989 | Nishikawa | H04N 1/4058 358/3.1 |
| 8,405,839 B2 * | 3/2013 | Otake | H04N 1/00307 358/1.13 |
| 9,148,526 B2 | 9/2015 | Matsuzaki | |
| 2006/0126093 A1 * | 6/2006 | Fedorovskaya | G06K 9/00255 358/1.14 |
| 2007/0248287 A1 * | 10/2007 | Chao | G06T 7/13 382/300 |

(Continued)

*Primary Examiner* — Helen Zong
(74) *Attorney, Agent, or Firm* — Canon U.S.A., Inc. IP Division

(57) ABSTRACT

An apparatus that enables an operator to easily perform an image diagnosis by ascertaining an analysis image that does not include an unnecessary image and that reduces a user's superfluous indication. A forming unit forms an image on a sheet. An image reading unit reads image data from an original. An output processing unit outputs a second analysis image that is obtained by adding a predetermined image pattern to a first analysis image for an image diagnosis to a sheet with the forming unit. A read processing unit reads the sheet on which the second analysis image is output with the image reading unit and generates first image data. An analysis unit analyzes the first image data. An erasing unit generates second image data that is displayed for the image diagnosis by erasing the predetermined image pattern from the first image data.

18 Claims, 13 Drawing Sheets

(56) References Cited

U.S. PATENT DOCUMENTS

| | | | |
|---|---|---|---|
| 2008/0129825 A1* | 6/2008 | Deangelis | A63B 24/0021 348/169 |
| 2012/0243020 A1* | 9/2012 | Saito | B41J 3/46 358/1.13 |
| 2015/0086136 A1* | 3/2015 | Mizuno | G06T 3/4007 382/298 |
| 2017/0339308 A1* | 11/2017 | Fujita | G03G 15/043 |

* cited by examiner

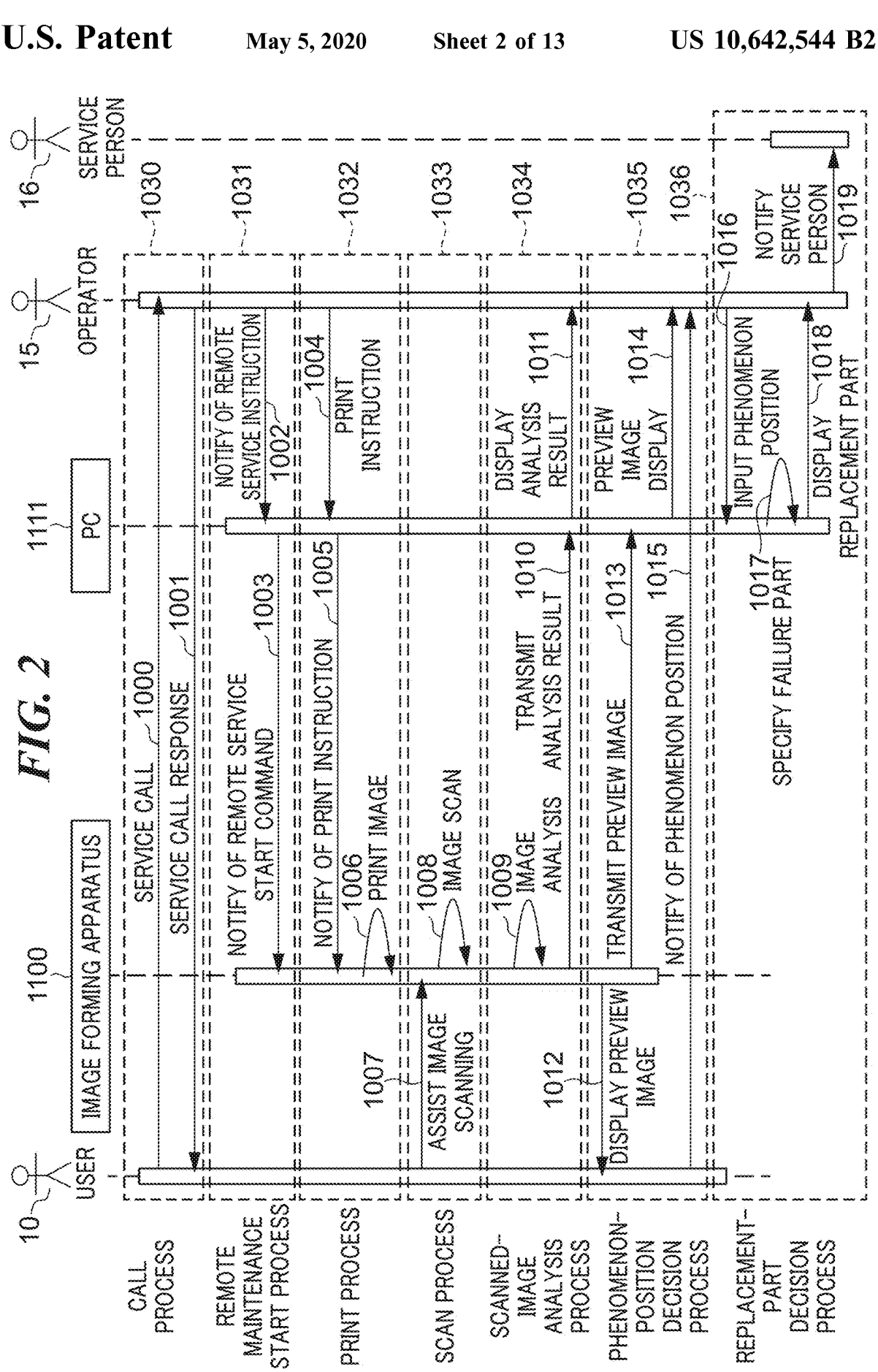

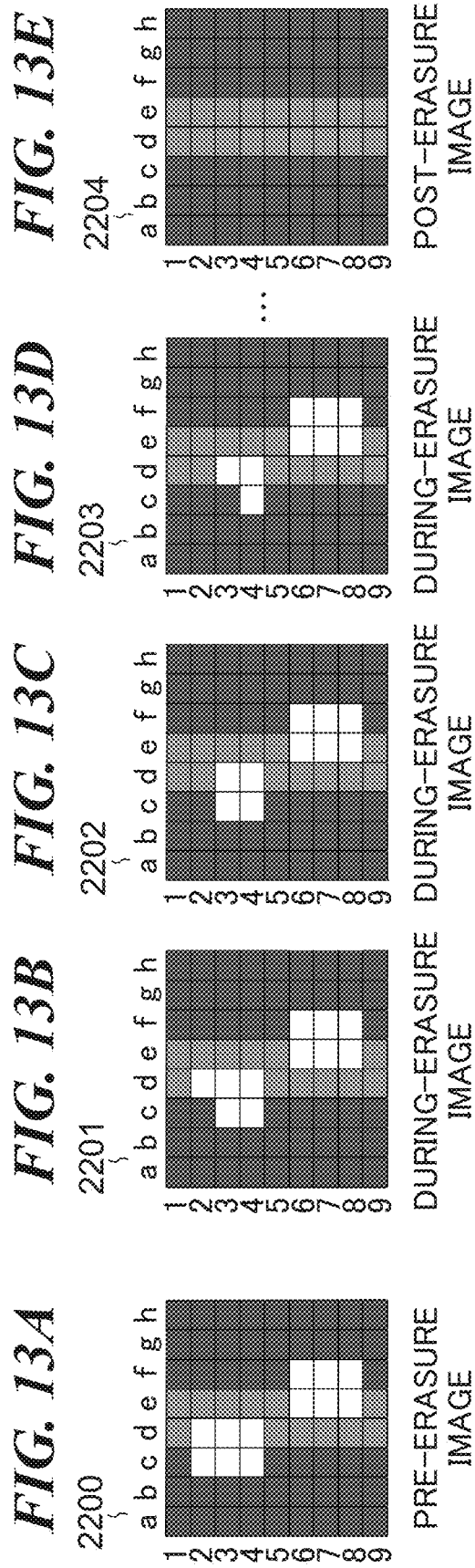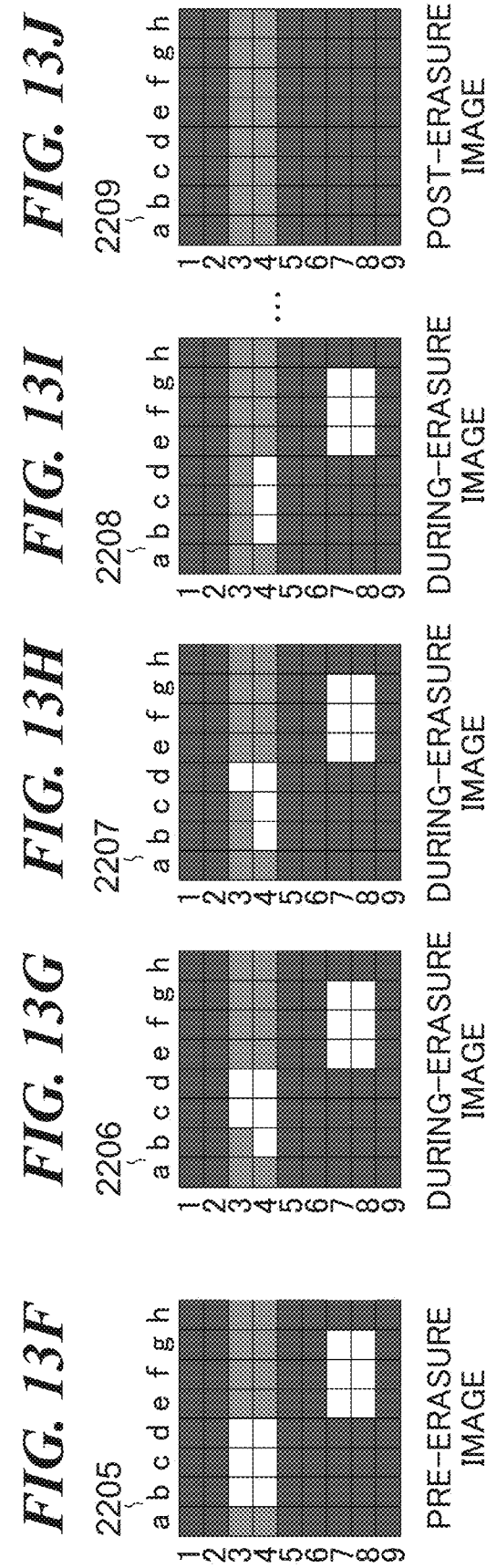

IMAGE FORMING APPARATUS CAPABLE OF UNDERGOING REMOTE IMAGE DIAGNOSIS, CONTROL METHOD THEREFOR, AND STORAGE MEDIUM STORING CONTROL PROGRAM THEREFOR

BACKGROUND OF THE INVENTION

Field of the Invention

The aspect of the embodiments relates to control of an image forming apparatus that is capable of undergoing a remote image diagnosis.

Description of the Related Art

A printer that outputs a high-definition image has appeared in recent years according to improved efficiency of electrophotography. Long time use of such a printer deteriorates components of the printer, which may lower quality of an image output from the printer. Since an "image quality problem" that is caused by degradation of components is difficult for an automatic detection with a sensor, a service person copes with the problem in response to an indication from a user in many cases.

It should be noted that an image quality problem is difficult to be expressed in words. For example, when a user says that there is an unevenness, its cause cannot be specified unless obtaining detail information, such as a direction, frequency, and cycle of the unevenness. Accordingly, a service person may need to go to a user's spot and to ascertain an image quality problem whenever an indication of an image quality problem is received from a user. Then, the service person expects a broken component, returns back to a service center once to obtain a component to be exchanged, and goes to the user's spot again to cope with the problem.

However, such a method does not only incur a cost for movement of the service person, but may also has a problem that lowers user productivity by causing downtime because an apparatus cannot be used until completion of coping.

U.S. Pat. No. 9,148,526 suggests a technique that specifies a component that causes an image quality problem by using a feature amount that is obtained by scanning a beforehand-prepared image (hereinafter referred to as an "analysis image") that is easy to analyze an image quality problem and is printed by a user when an image quality problem occurs and a reference feature amount corresponding to durability of a scanner.

However, since an image quality problem occurred in an image forming apparatus appears significantly on the sheet on which the above-mentioned analysis image is printed, a slight image quality problem that a user does not usually notice becomes also conspicuous, which causes a superfluous indication from the user. Accordingly, there is a known technique that prints a camouflage pattern in addition to an analysis image so as not to cause such a superfluous indication.

A remote maintenance system is required to grasp an image quality problem correctly in a short period by viewing (preview displaying) an analysis image that is output and scanned by a user's image forming apparatus by an operator or a service person at a remote location. However, there is a problem that an operator who ascertains an analysis image becomes difficult to visually recognize an image quality problem occurred in the analysis image when an unnecessary image, such as a camouflage pattern, is included in the analysis image.

SUMMARY OF THE INVENTION

An aspect of the embodiments provides an apparatus comprising a forming unit configured to form an image on a sheet, a reading unit configured to read image data from an original, an output processing unit configured to output a second analysis image that is obtained by adding a predetermined image pattern to a first analysis image for an image diagnosis to a sheet with the forming unit, a read processing unit configured to read the sheet on which the second analysis image is output with the reading unit and to generate first image data, an analysis unit configured to analyze the first image data, and an erasing unit configured to generate second image data that is displayed for the image diagnosis by erasing the predetermined image pattern from the first image data.

Further features of the disclosure will become apparent from the following description of exemplary embodiments with reference to the attached drawings.

BRIEF DESCRIPTION OF THE DRAWINGS

FIG. 2 is a sequential chart showing an entire flow of a process executed by the remote maintenance system according to the first embodiment.

FIG. 13A through FIG. 13J are schematic views showing stages of the camouflage erasing process according to the third embodiment.

DESCRIPTION OF THE EMBODIMENTS

Hereafter, embodiments according to the disclosure will be described in detail with reference to the drawings. It should be noted that configurations shown in the following embodiments are mere examples and the disclosure is not limited to the illustrated configurations.

Figure 1:
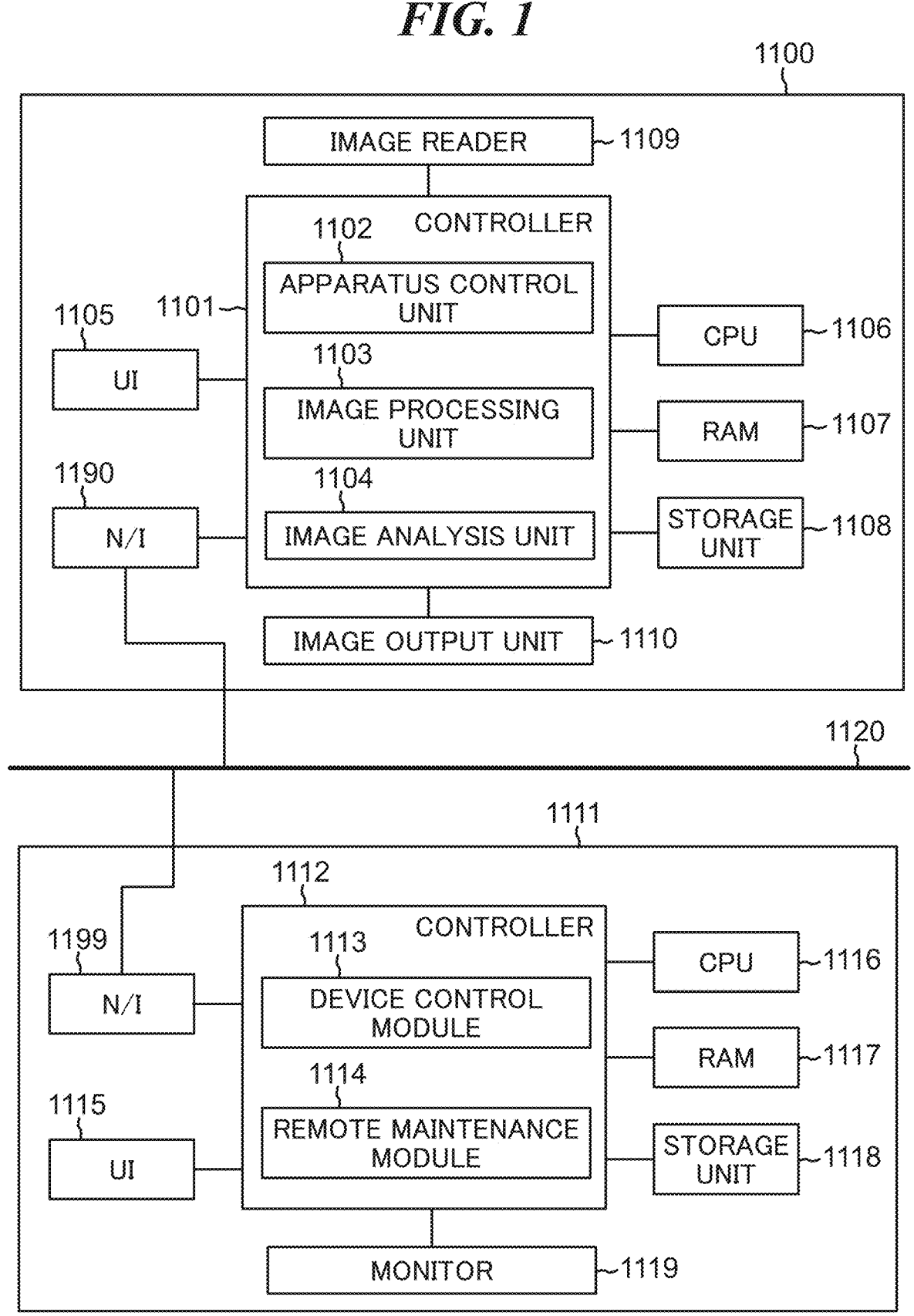
FIG. 1 is a block diagram schematically showing a configuration of a remote maintenance system for an image forming apparatus according to a first embodiment of the disclosure.

FIG. 1 is a block diagram showing an example of a configuration required to achieve a remote maintenance system (it is also called a telediagnosis system) for an image forming apparatus according to a first embodiment of the disclosure.

A storage unit 1108 in the image forming apparatus 1100 stores parameters for controlling the image forming apparatus 1100, application programs for achieving the first embodiment, an operating system (OS), etc. A CPU 1106 performs various control processes by reading and running programs stored in the storage unit 1108. A RAM 1107 is used as a workspace of the CPU 1106.

An image reader 1109 scans an original stacked on an ADF (Auto Document Feeder) or a platen glass, which are not shown, and generates scanned image data. An image output unit 1110 forms an image on a recording medium like a paper sheet according to image data.

A controller 1101 provides a function to obtain scanned image data from the image reader 1109, a function to process image data and store it to the storage unit 1108, a function to print out an image on a paper sheet through the image output unit 1110, and a function to display an image through a user interface (UI) 1105.

The controller 1101 has an apparatus control unit 1102, image processing unit 1103, and image analysis unit 1104. The apparatus control unit 1102 controls the image forming apparatus 1100. The image processing unit 1103 optimizes image data. The image analysis unit 1104 analyzes a chart for an image diagnosis. Moreover, the image analysis unit 1104 reads a scanned image scanned by the image reader 1109 from the storage unit 1108, analyzes it, and saves the analysis result to the storage unit 1108 through the controller 1101.

It should be noted that the apparatus control unit 1102 and the image analysis unit 1104 are implemented by software. Moreover, the image processing unit 1103 is implemented by an image processing chip (an ASIC, for example) and software. It should be noted that the function implemented by software is achieved when the CPU 1106 loads a control program (not shown) stored in the storage unit 1108 to the RAM 1107 and runs it.

The UI 1105 is an operation panel equipped with a display unit with a touch panel and hard keys. The UI 1105 notifies the controller 1101 of various set values and displays various pieces of information according to a display instruction from the controller 1101. The image processing unit 1103 in the controller 1101 processes image data on the basis of the values set up through the UI 1105. Alternatively, in the controller 1101, the apparatus control unit 1102 saves the values set up through the UI 1105 to the storage unit 1108 and the image processing unit 1103 reads the set values saved to the storage unit 1108 and processes image data.

A network interface (N/I) 1190 communicably connects the image forming apparatus 1100 to a personal computer (PC) 1111 through communication media like a network 1120. The image forming apparatus 1100 is able to undergo a remote diagnosis of an image by the PC 1111 through the network 1120.

The above-mentioned configuration is used for the image forming apparatus 1100 at the user side at least, and network interfaces, such as a router and a firewall, and a computer (PC) that is connected to the image forming apparatus 1100 may be added, if needed. Moreover, a configuration that is needed when the image forming apparatus 1100 whole is taken into consideration can be added.

The PC 1111 is an information processing apparatus in a service center. A network interface (N/I) 1199 enables the PC 1111 to communicate with the image forming apparatus 1100 through communication media like the network 1120. The PC 1111 exchanges image data, analysis data, control data, etc. with the image forming apparatus 1100 through communication media like the network 1120.

A storage unit 1118 stores parameters for controlling the PC 1111, application programs for achieving the first embodiment, and an OS. A CPU 1116 performs various control processes by reading and running programs stored in the storage unit 1118. A RAM 1117 is used as a workspace of the CPU 1116. A UI 1115 is a user interface including a mouse and a keyboard.

A controller 1112 is implemented by software. That is, the controller 1112 is achieved when the CPU 1116 loads a control program (not shown) stored in the storage unit 1118 to the RAM 1117 and runs it. The controller 1112 has an apparatus control unit 1113 that controls the PC 1111 and a remote maintenance unit 1114 that performs remote maintenance.

The apparatus control unit 1113 performs an arithmetic process and an input/output process about data and an image, and displays an image, an analysis result, and instruction information from the UI 1115 on a monitor 1119.

The remote maintenance unit 1114 is notified of various instruction from the UI 1115 and processes an image and analysis data stored in the storage unit 1118 through the apparatus control unit 1113 according to a notified instruction. Moreover, the remote maintenance unit 1114 obtains an image (a screen) displayed on the UI 1105 of the image forming apparatus 1100 through the network 1120. The UI 1115 notifies the controller 1112 of contents of various operations. The monitor 1119 displays various pieces of information according to display instructions from the controller 1112.

The above-mentioned configuration is used for the PC 1111 in the service center at least, and other network interfaces may be added, if needed. Moreover, a configuration that is needed when the entire remote maintenance system of the first embodiment is taken into consideration can be added.

An implementation configuration of the remote maintenance system to which the disclosure is applicable is not limited to the above-mentioned configuration. For example, a part of the function of the image analysis unit 1104 and a part of the function of the storage unit 1108 in the image forming apparatus 1100 may be achieved by a remote apparatus that is connected through the network 1120 like a cloud.

Next, an outline of operations to specify a cause of an image quality problem that are performed when a remote maintenance operator 15 who receives a notice from a user 10 remotely controls the user's image forming apparatus 1100 in which an image quality problem occurs will be described with reference to a sequential chart in FIG. 2. FIG. 2 is the sequential chart showing an entire flow of the process executed by the remote maintenance system.

When the user 10 ascertains occurrence of an image quality problem of the image forming apparatus 1100, the user 10 first makes a phone call to the remote maintenance operator 15 in a call process 1030 (1000). The operator 15 hears a requirement from the user 10 and responds (1001). When the requirement concerns an image quality problem, the operator 15 proceeds with the process to the following remote maintenance start process 1031.

In the remote maintenance start process 1031, when the operator 15 presses a remote maintenance start button displayed on the monitor 1119 of the PC 1111, the PC 1111 is notified of a remote maintenance start instruction (it is also called a remote service instruction) (1002). Corresponding to this, the PC 1111 notifies the image forming apparatus 1100 of a remote maintenance start command (or a remote service start instruction) (1003). When receiving the remote maintenance start command, the image forming apparatus 1100 shifts to a print process 1032. Remote maintenance means maintenance service that the remote maintenance operator 15 directly operates the image forming apparatus 1100 that is out of order from a remote location.

In the print process 1032, the operator 15 presses a button that instructs to print an analysis image and is displayed on the monitor 1119 of the PC 1111 (1004). Corresponding to this, the PC 1111 notifies the image forming apparatus 1100 of a print-instruction notice command for printing an image for image analysis (1005). Then, the image forming apparatus 1100 prints the image for image analysis on a sheet (an output process) (1006). The image printed in this process is a second analysis image that is formed by adding a high-frequency image pattern (hereinafter referred to as a camouflage image) to a first analysis image for the image diagnosis. Details will be mentioned later.

Next, the image forming apparatus 1100 first prompts the user 10 to put the sheet on which the analysis image (it is also called a chart) has been printed on the ADF (not shown) of the image reader 1109 through a UI display, for example, in a scan process 1033. Corresponding to this, the user 10 assists the scanning by stacking the sheet on which the analysis image has been printed on the ADF (1007). Completion of assistance of the scanning may be input to the image forming apparatus 1100 by press of a button by the user or may be decided when the image forming apparatus 1100 detects the sheet put on the ADF. When detecting the completion of assistance of the scanning, the image forming apparatus 1100 scans the image printed on the sheet put on the ADF (a read process) (1008). That is, the image forming apparatus 1100 reads the sheet on which the second analysis image has been output (printed) and generates first image data.

Next, the image forming apparatus 1100 analyzes the scanned image (1009) and notifies the PC 1111 of an analysis result by a transmission command (1010) in a scanned-image analysis process 1034. The PC 1111 displays the received analysis result on the monitor 1119 (1011) by an analysis-result display command. It should be noted that the analysis result includes information about a defect of the image quality detected by analyzing the scanned image. For example, the analysis result includes information about a color region in which a streak occurs in the below-mentioned analysis image, depth of the streak, and a position of the streak. Moreover, the image forming apparatus 1100 erases the camouflage image from the first image data that is the scanned image in order to generate second image data for displaying for the image diagnosis.

Next, the image forming apparatus 1100 displays the image (hereinafter referred to as a "preview image") of the second image data on the UI 1105 according to a preview image display command (1012) in a phenomenon-position decision process 1035. Simultaneously, the image forming apparatus 1100 transmits the preview image to the PC 1111 by a preview-image transmission command (1013).

The PC 1111 displays the received preview image on the monitor 1119 by a preview-image display command (1014). Then, the user 10 notifies the operator 15 of the position (phenomenon position) considered as an image quality problem in the preview image (1015). It is assumed that the user 10 notifies the operator 15 by making a phone call. In the meantime, the user 10 may notify the PC 1111 through the image forming apparatus 1100. Details will be mentioned later.

It should be noted that the user may specify the phenomenon position by looking at the sheet on which the second analysis image has been printed. Even in such a case, the phenomenon position is pointed out on the preview image currently displayed. That is, symbols for specifying a position on a sheet are marked on the preview image as mentioned later, and a phenomenon position is specified with reference to the symbols.

Next, the operator 15 inputs the notified phenomenon position into the PC 1111 (1016) in a replacement-part decision process 1036. Then, the PC 1111 specifies a failure part (a replacement part) on the basis of the analysis result and the phenomenon position (1017). Then, the PC 1111 displays the replacement part on the monitor 1119 according to a replacement-part display command (1018).

Then, the operator 15 notifies the service person 16 of the decided replacement part through e-mail etc. (1019). The operator 15 may send a capture image of the preview image in the phenomenon-position, decision process 1035 and the analysis result accumulated in the PC 1111 to the service person 16. That ends the brief description about the sequence between the user 10 and the operator 15.

Figure 3A:
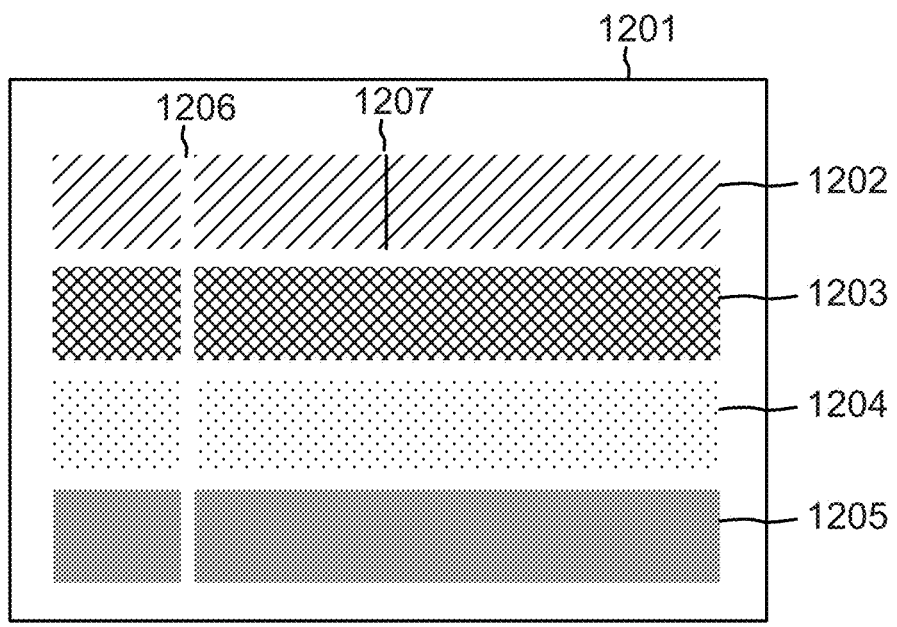
FIG. 3A and FIG. 3B are schematic views showing first analysis images according to the first embodiment.
Figure 3B:
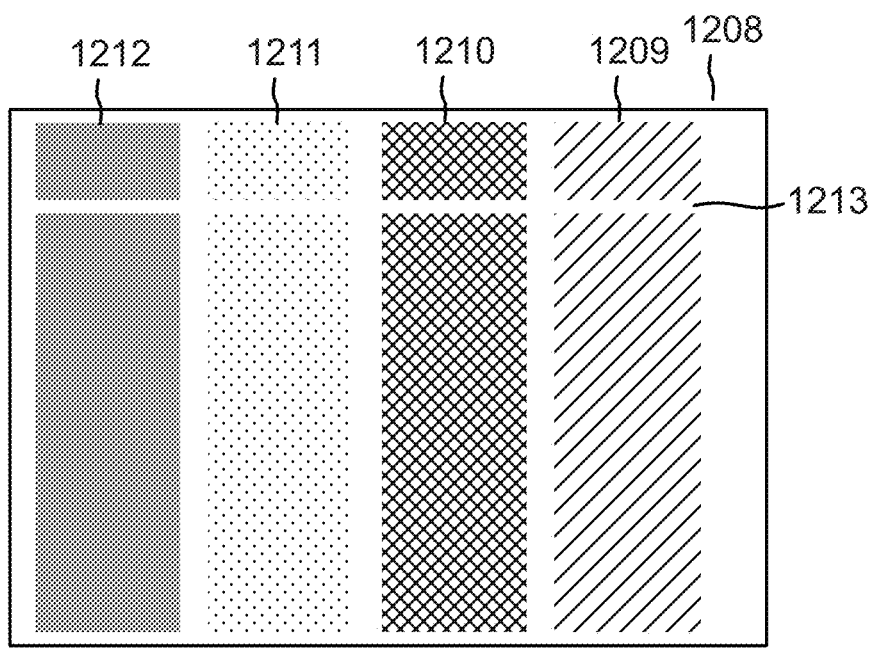

Hereinafter, the first analysis image (analysis chart) will be described with reference to FIG. 3A and FIG. 3B. FIG. 3A and FIG. 3B are schematic views showing first analysis images according to the first embodiment. The first analysis image 1201 shown in FIG. 3A is an example of a vertical streak detection chart that consists of regions of four colors including C (cyan), M (magenta), Y (yellow), and K (black) that are formed on an A4 sheet. It should be noted that a long side direction of each color region is a main scanning direction that intersects perpendicularly with a sheet conveyance direction at the time of outputting. Moreover, the direction that intersects perpendicularly with the main scanning direction is a subscanning direction.

A hatched part 1202 expresses a Y region, a grid part 1203 expresses a M region, a dot part 1204 expresses a C region, and a solid part 1205 expresses a K region. A light streak 1206 has occurred at the same position in the main scanning direction in each color region. A deep streak 1207 has occurred only in the Y region 1202.

The image analysis unit 1104 shown in FIG. 2 specifies a failure part by analyzing the result of scanning of the first analysis image. Specifically, the image analysis unit 1104 specifies a color region in which a streak occurs in the first analysis image, depth of the streak, and a position of the streak.

Moreover, the first analysis image 1208 shown in FIG. 3B shows an example of a horizontal streak detection chart. A hatched part 1209 expresses a Y region, a grid part 1210 expresses a M region, a dot part 1211 expresses a C region, and a solid part 1212 expresses a K region. A horizontal streak 1213 has occurred at the same position in the subscanning direction in each color region.

It should be noted that marks for detecting a position and information for specifying a chart type may be added to the first analysis image. Moreover, a margin area for detecting poor cleaning may be provided.

Figure 10A:
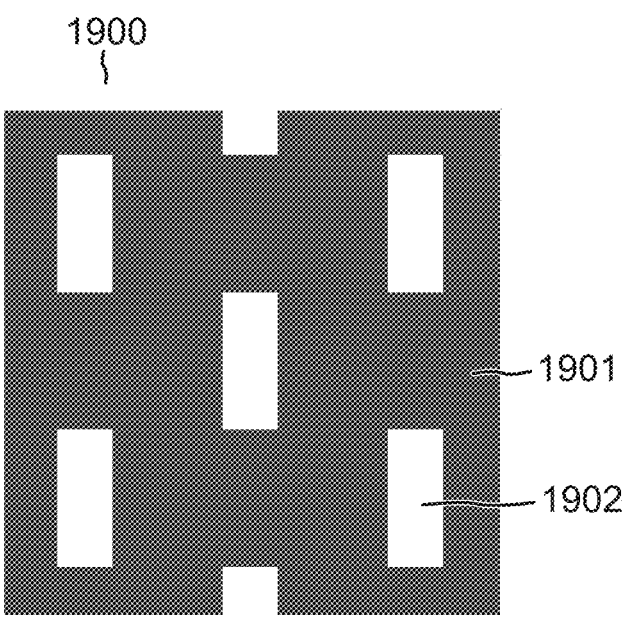
FIG. 10A and FIG. 10B are enlarged views showing examples of second analysis images each of which is formed by compositing a camouflage image according to the first embodiment to a first analysis image.
Figure 10B:
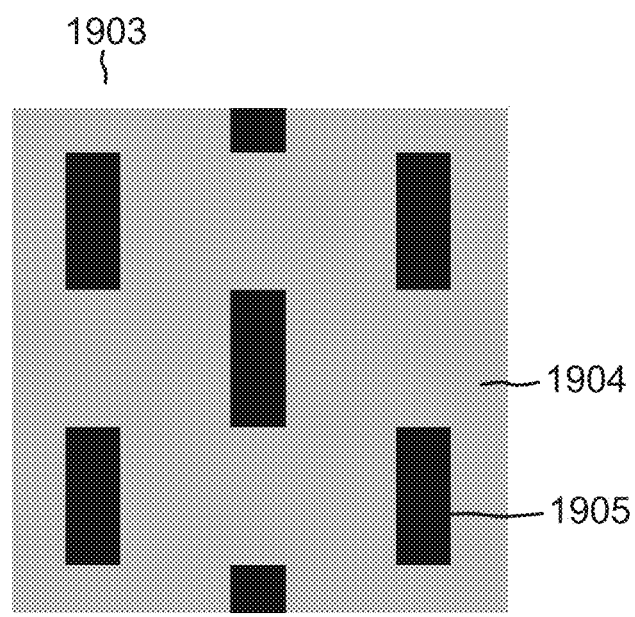

A camouflage image that is composited (added) to the first analysis image will be described with reference to FIG. 10A and FIG. 10B. FIG. 10A and FIG. 10B are enlarged views showing examples of second analysis images each of which is formed by compositing a camouflage image according to the first embodiment to a first analysis image. FIG. 10A schematically shows a second analysis image 1900 that is a part of an image that a high-frequency camouflage image is composited to a first analysis image 1901 that is a background. The second analysis image 1900 uses a white pattern as a camouflage image.

Each pattern 1902 that constitutes the camouflage image is a sufficiently small block area of about 2*9 pixels, for example. The second analysis image 1900 shows an example where the patterns 1902 are repeatedly arranged at intervals of 32 pixels in the vertical and horizontal directions. And the phase of the patterns 1902 on a line in the vertical direction are shifted by 10 pixels from the phase of the patterns 1902 on an adjacent line in the vertical direction. Thus, the camouflage image is an image in which block areas are arranged cyclically. In the meantime, the size of the pattern 1902 is not limited to the above example. The size is enough to be reproduced by the image forming apparatus 1100 and not to disturb appearance of the first analysis image. All the patterns 1902 are not always the same size. Moreover, the intervals of the patterns 1902 in the vertical and horizontal directions and the shift of the phases are not limited to the above example. The patterns 1902 are enough to be arranged so that a camouflage effect appears corresponding to the first analysis image.

When the high-frequency image patterns that are generated for the camouflage image are white, the aimed effect is obtained without increasing toner consumption.

When the colors of the first analysis image are light, the white patterns 1902 of the camouflage image may be hard to obtain the effect. Moreover, when the camouflage image cannot be composited as electronic data, the camouflage image may be re-printed to composite after printing the first analysis image on a sheet. In such a case, deep patterns 1905 is composited to a first analysis image 1904 like a second analysis image 1903 shown in FIG. 10B. The second analysis image 1903 shows an example that the deep patterns 1905 are composited to the light first analysis image 1904. The deep patterns 1905 are to have a high-density color, such as black, cyan, and magenta.

Hereinafter, an object of composition of the camouflage image and removal of the camouflage image, which is the characteristic feature of the first embodiment, will be described. In the remote maintenance system, when the analysis image is output (the print process 1032 in FIG. 2), the second analysis image to which the camouflage image is composited is output as mentioned above. Composition of the camouflage image is effective for preventing a user from visually recognizing image quality problems, such as unevenness of an image, a slight streak, and contamination, mainly. The reason is because the first analysis image aims at detection of image quality problems, which tends to reveal a slight image quality problem that a user does not usually notice. This facilitates user's visual recognition about an important image quality problem and facilitates indication of an important image quality problem while focusing thereon by preventing the user from visually recognizing slight image quality problems.

In the meantime, when the preview image is displayed (the preview image displays 1012 and 1014 in FIG. 2) on the basis of the second analysis image that is scanned in the scan process 1033 in FIG. 2, in one embodiment, there be no camouflage image. The reason is because the preview display of only the first analysis image to which the camouflage image is not composited is effective in specifying an image quality problem correctly in short time by the user and operator viewing the preview image. Moreover, it is ideal that the user and operator are able to ascertain the same image when ascertaining an analysis image. In the first embodiment, the same preview image that the camouflage image has been erased is displayed on the UI 1105 of the image forming apparatus 1100 and the UI 1105 of the PC 1111. This enables the user and operator to ascertain the same analysis image after specifying the position at which an image quality problem occurs through the analysis process.

Furthermore, when the scanned image is transmitted to the PC 1111 in the service center through a server (not shown) and when an operator or a service person looks at the image received by the PC 1111, viewing of only the first analysis image (the image from which the camouflage image has been erased) is easier to grasp the state of the image forming apparatus 1100.

Moreover, since data volume should be reduced as small as possible when the image data is transmitted via the network 1120, resolution is dropped or compression efficiency is improved by removing the camouflage image. Due to the above reasons, it is effective to composite a camouflage image when an analysis image is output and to remove the camouflage image from a preview image or a transmission image after scanning.

The first embodiment is premised on the drop of the resolution at the time of generating an image for preview or transmission, and the characteristic feature is the removal of the camouflage image at the time of dropping the resolution. Accordingly, generation of the camouflage image in consideration of resolution conversion and a downsampling process for dropping resolution become important.

Figure 4:
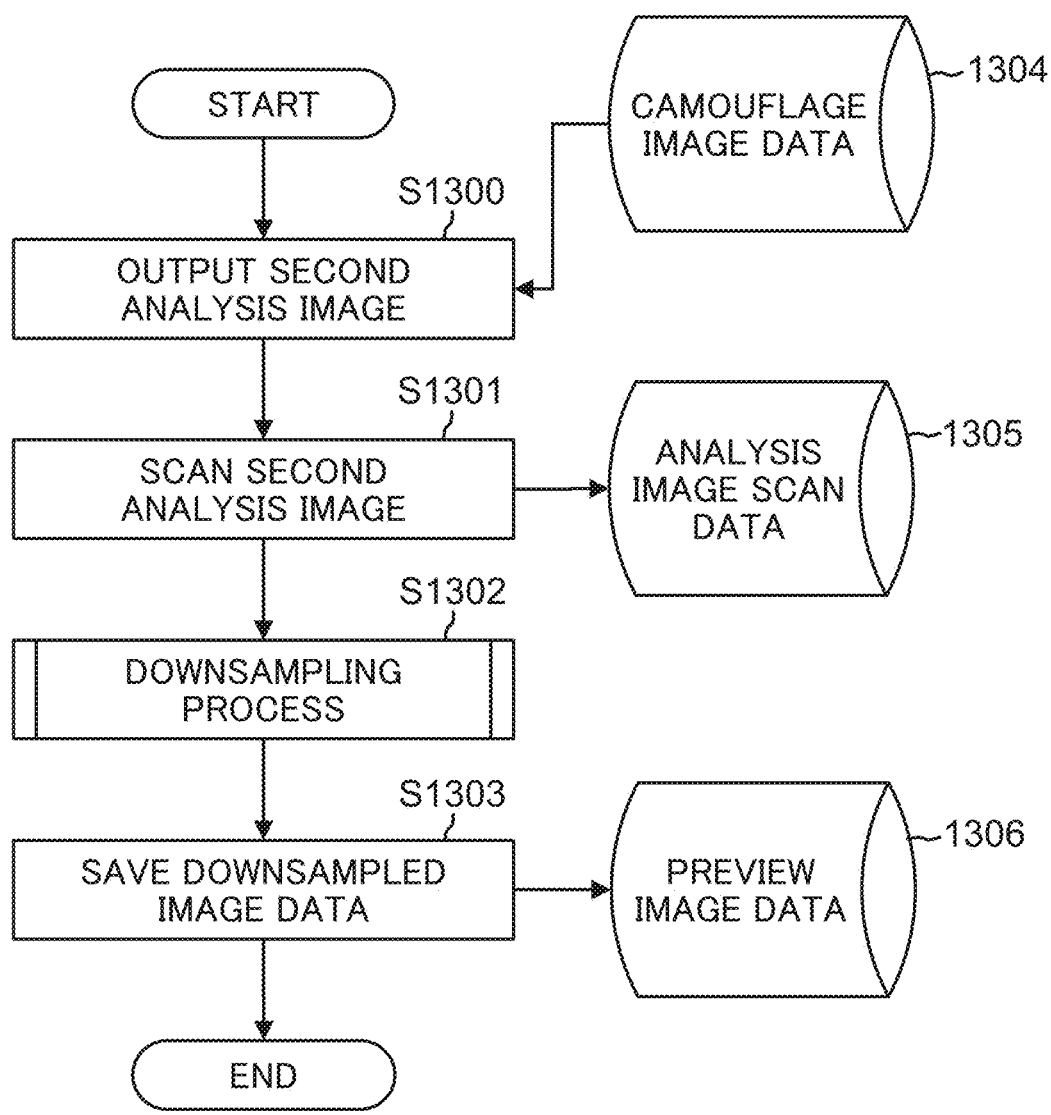
FIG. 4 is a flowchart showing a process procedure of the image forming apparatus according to the first embodiment.
Figure 5:
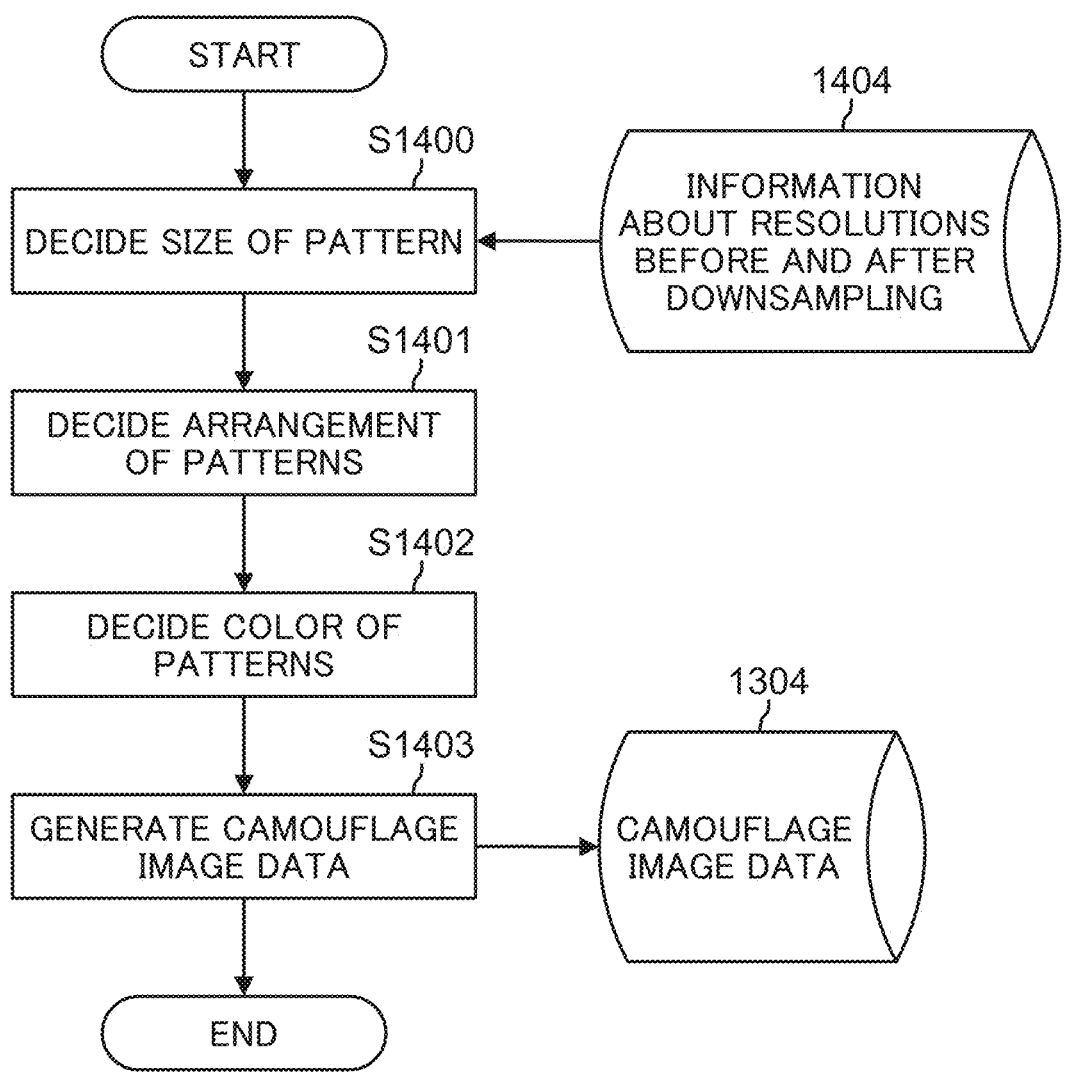
FIG. 5 is a flowchart showing a camouflage image generation process according to the first embodiment.
Figure 6:
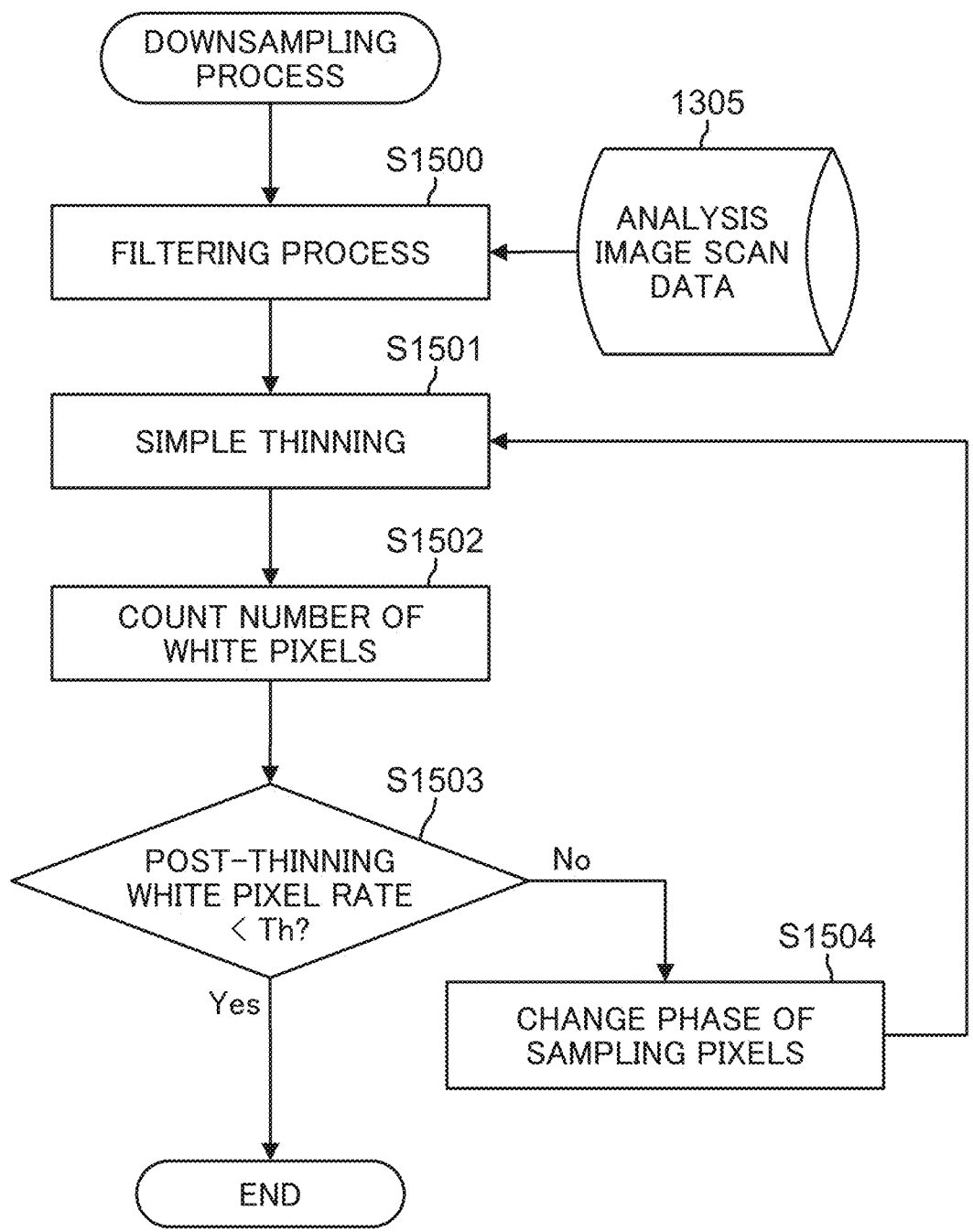
FIG. 6 is a flowchart showing a downsampling process according to the first embodiment.

The flow of the process of the first embodiment will be described with reference to FIG. 4. FIG. 4 is a flowchart showing an example of a process procedure of the image forming apparatus 1100 according to the first embodiment. The process shown in FIG. 4 and below-mentioned processes shown in FIG. 5 and FIG. 6 are achieved when the CPU 1106 of the image forming apparatus 1100 loads a control program (not shown) stored in the storage unit 1108 to the RAM 1107 and runs it.

In S1300, the controller 1101 prints and outputs the second analysis image from the image output unit 1110. When printing the second analysis image, the controller 1101 reads analysis image data (not shown), which has been generated and saved in the storage unit 1108 beforehand, and camouflage image data 1304, composites the image data by the image processing unit 1103, and transmits the composite image data to the image output unit 1110. Alternatively, the controller 1101 once saves the composite image to the storage unit 1108, and transmits the saved image to the image output unit 1110. It should be noted that the analysis image data is electronic data that is an origin for achieving the configuration of the first analysis image. Generation of the camouflage image data 1304 will be described later with reference to FIG. 5. When the images are composited, the analysis image data is overwritten by the patterns (for example, 1902 in FIG. 10A or 1905 in FIG. 10B) of the camouflage image data 1304. Then, the second analysis image in which the analysis image data is printed in an area (for example, 1901 in FIG. 10A or 1904 in FIG. 10B) of the first analysis image and the patterns (1902 or 1905) are printed in camouflage parts is generated.

Next, in S1301, the controller 1101 scans the second analysis image using the image reader 1109 and saves analysis image scan data (first image data) 1305 that is obtained by scanning to the storage unit 1108. The resolution of the analysis image scan data 1305 is the maximum resolution (for example, 600 dpi but is not limited to this) achieved by the image reader 1109 of the general image forming apparatus 1100. The analysis image scan data 1305 is read from the controller 1101 in the scanned-image analysis process 1034 (FIG. 2), is transmitted to the image analysis unit 1104, and is analyzed. An analysis result is transmitted to the PC 1111 at the service center.

Next, in S1302, the controller 1101 reads the analysis image scan data 1305 from the storage unit 1108 and downsamples the data. Although the resolution after downsampling is low and the data size becomes small to some extent, there is a risk of disappearing image quality problems, such as a thin streak. Accordingly, realistic resolution after downsampling is about 200 dpi. In the meantime, the resolution after downsampling should be a value of which an integral multiple is equal to the resolution of the analysis image scan data 1305. It may be 300 dpi or 100 dpi. The details of downsampling will be described later with reference to FIG. 6.

Next, in S1303, the controller 1101 saves the downsampled image data as preview image data 1306 or transmission image data to the storage unit 1108 and finishes the process of this flowchart.

Figure 11:
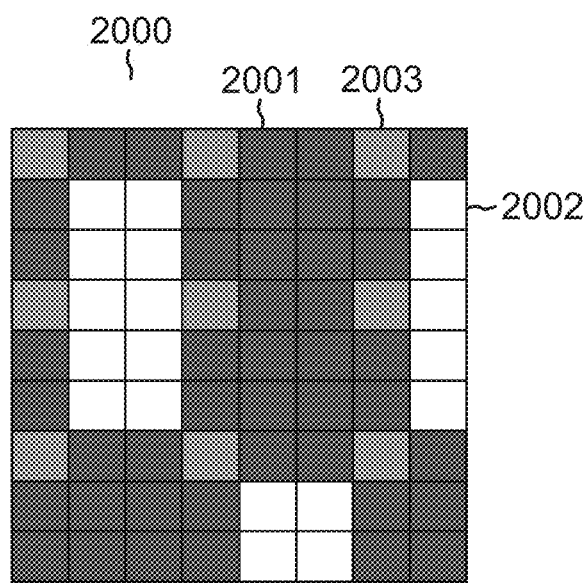
FIG. 11 is a schematic view showing downsampling pixels according to the first embodiment.

Hereinafter, generation of the camouflage image data 1304 in consideration of the resolution conversion in the first embodiment will be described with reference to FIG. 5 and FIG. 11. FIG. 5 is a flowchart showing an example of a camouflage image generation process according to the first embodiment. FIG. 11 is a schematic view showing an example of a downsampling pixel according to the first embodiment. The example in FIG. 11 corresponds to a part 2000 of the second analysis image that is generated by compositing the camouflage image data 1304 with the white patterns 1902 in FIG. 10A. Each square indicates one pixel. Although the case where the resolution is downsampled from 600 dpi to 200 dpi will be described in the following description, the disclosure is not limited to this case.

In FIG. 11, a black pixel indicates an analysis pixel 2001 showing the first analysis image 1901. Moreover, a white pixel indicates a camouflage pixel 2002 showing the pattern 1902. Moreover, a gray pixel indicates a sampling pixel 2003 that will be extracted by sampling at the time of downsampling.

FIG. 5 shows a flow of generating the camouflage image data 1304. Although the description is premised that the camouflage image is generated in the image forming apparatus 1100, the camouflage image that has been generated beforehand by a PC (not shown) may be transferred to the storage unit 1108 via a network (not shown) and saved.

In S1400, the controller 1101 obtains information 1404 about resolutions before and after downsampling that has been input through the UI 1105 and saved in the storage unit 1108 by the controller 1101 from the storage unit 1108 and decides the size of the pattern 1902. In this case, since the resolution before downsampling is 600 dpi and the resolution after downsampling is 200 dpi, the controller 1101 decides that the analysis image scan data 1305 is sampled at intervals of 3 pixels on the basis of the information 1404 about resolutions before and after downsampling. Accordingly, the size of short side of the pattern 1902 (FIG. 10A) is decided as two-pixel length or less that is smaller than three-pixel length that is the interval of the sampling pixels 2003. The size of long side of the pattern 1902 is any pixel length. Although the pattern 1902 has two-pixel length in the main scanning direction and is long in the subscanning direction in this example, the pattern 1902 may have two-pixel length in the subscanning direction and may be long in the main scanning direction.

In S1401, the controller 1101 decides the arrangement of the patterns 1902. In order to remove the patterns 1902 in the downsampling process (S1302 in FIG. 4), the interval of the patterns 1902 is important as well as the size of the pattern 1902. The arrangement decision (S1401) of the patterns 1902 means prescribing the interval of the patterns. The patterns 1902 are arranged at the interval of a multiple of three-pixel length, which is the interval of the sampling pixels 2003, in the direction in which the size has been decided as two-pixel length or less in the pattern size decision (S1400). This avoids overlapping the patterns 1902 and the downsampling pixels 2003. When the patterns 1902 satisfy the above-mentioned size and arrangement, the patterns 1902 will not be extracted in the downsampling process (S1302) and will be removed after downsampling.

Next, in S1402, the controller 1101 decides the color of the patterns 1902. As mentioned above, the controller 1101 selects the color of the patterns 1902 from among white, black, and other colors, such as Cyan and Magenta. For example, the controller 1101 obtains the information about the color of the patterns, which has been input through the UI 1105 and has been saved to the storage unit 1108 by the controller 1101, from the storage unit 1108 and decides the color of the patterns 1902 on the basis of the read information.

The controller 1101 generates in S1403 the camouflage image data 1304 in which the patterns of the decided size, arrangement, and color are repeated all over the image of which the size is the same as the first analysis image, and then, finishes the process of this flowchart. It should be noted that other pieces of information, such as the image size and an arrangement interval of the pattern 1902 in the direction that has not been decided in S1401, shall be read from the storage unit 1108 or shall be input through the UI 1105, when the camouflage image data 1304 is generated.

Next, the details of the downsampling process in S1302 will be described with reference to FIG. 6. FIG. 6 is a flowchart showing an example of a procedure of the downsampling process according to the first embodiment.

In S1500, the controller 1101 reads the analysis image scan data 1305 from the storage unit 1108 and performs a filtering process. In one embodiment, the filtering process aims to smooth halftone dots of the first analysis image and is to maintain the pixel values in the camouflage parts as much as possible. Accordingly, a bilateral filter or a filter with polarity corresponding to the shape of the pattern 1902 is used by the minimum filter intensity that smooths halftone dots.

Next, in S1501, the controller 1101 applies simple thinning to the analysis image scan data 1305 after applying the filtering process (S1500). Although there are other image downsampling methods, such as a bicubic method and a bilinear method, in one embodiment, the simple thinning is used to remove the camouflage image in the first embodiment. The image data (the second image data) after applying the simple thinning (S1501) is saved in the storage unit 1108.

Next, in S1502, the controller 1101 reads the image data after applying the simple thinning (S1501) from the storage unit 1108, counts the number of white pixels (white pixel number), and determines whether the removal of the camouflage image succeeded on the basis of the counted result. Hereinafter, a case where the removal of the camouflage image succeeded and a case where it failed will be described with reference to FIG. 12A through FIG. 12D. It should be noted that the case where the removal of the camouflage image succeeded is referred to as "downsampling success" and the case where it failed is referred to as "downsampling failure".

Figure 12A:
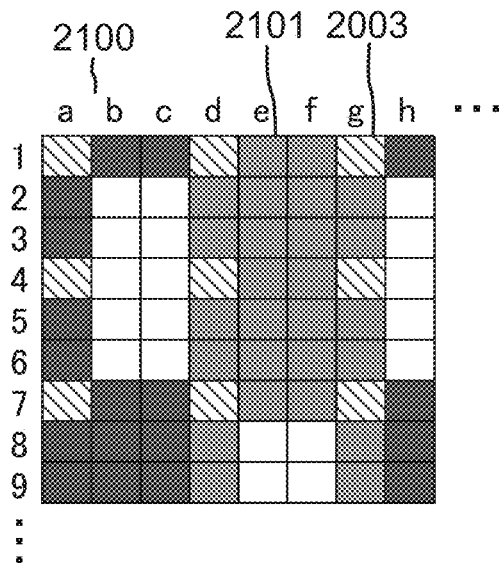
FIG. 12A through FIG. 12D are schematic views showing examples when downsampling has succeeded and failed according to the first embodiment.

FIG. 12A through FIG. 12D are schematic views showing examples of the downsampling success and downsampling failure. In FIG. 12A through FIG. 12D, a coordinate using an alphabet and a number is given to each pixel for description. FIG. 12A shows an image 2100 in which the sampling pixels are arranged at positions that cause the downsampling success. The image 2100 corresponds to a scanned image of the part 2000 of the second analysis image in FIG. 11 and corresponds to the state where a streak thinner than the analysis image has occurred. Gray pixels within an area 2101 indicate the streak thinner than the analysis image.

Figure 12B:
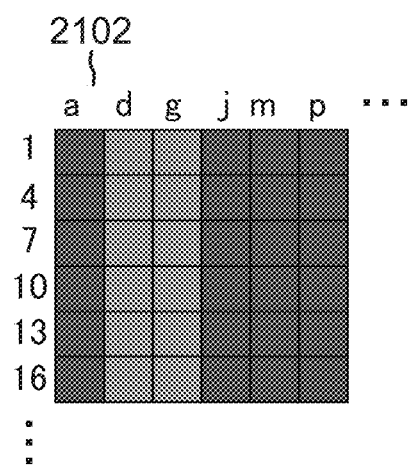

A downsampling image 2102 of the successful example shown in FIG. 12B is generated by extracting the sampling pixels (hatching pixels) 2003 from the image 2100. The succeeded downsampling image 2102 does not include the camouflage image and is constituted by the pixels other than the pixels that constitute the camouflage image.

Figure 12C:
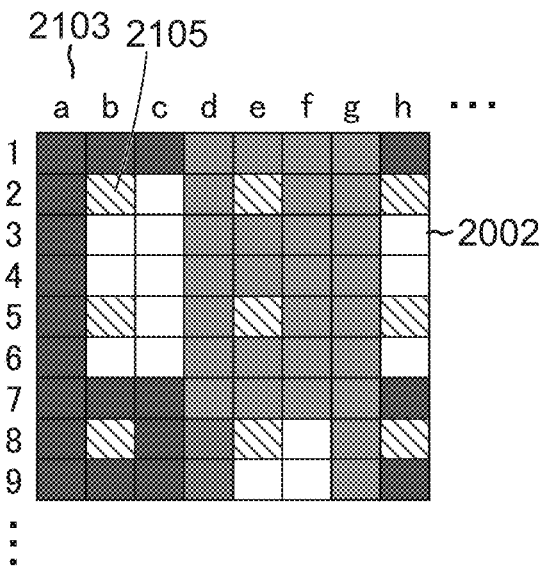
Figure 12D:
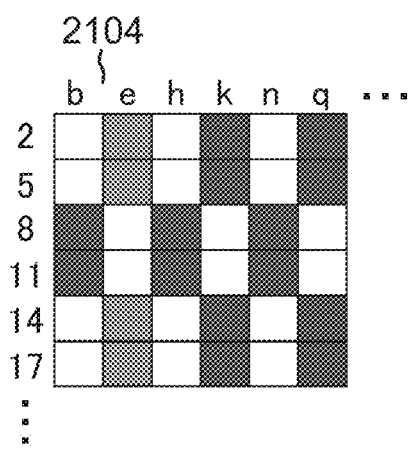

In the meantime, FIG. 12C shows an image 2103 in which the sampling pixels are arranged at positions that cause the downsampling failure. The positions of the sampling pixels 2105 in the image 2103 are shifted by one pixel from the positions of the sampling pixels 2003 in the image 2100, which is the successful example, in both the main scanning direction and subscanning direction. In this case, when the sampling pixels 2105 are extracted, a downsampling image 2104 of the failure example as shown in FIG. 12D in which the many camouflage pixels 2002 remain will be generated. Like this, the image in which the camouflage pixels remain is failure. Hereinafter, the description returns back to the flowchart in FIG. 6.

The white pixel number count (S1502) mentioned above is a process for detecting the camouflage pixels 2002 that remain after downsampling. Accordingly, when the color of the camouflage pixels 2002 is another color, the number of pixels corresponding to the color of the camouflage pixels 2002 is counted. In the determination of the color of the camouflage pixels 2002, when the color of a target pixel falls within a predetermined color difference range from the color of the camouflage image pattern in the camouflage image data 1304, the target pixel is determined as the camouflage pixel. The reason is because the color of the camouflage image pattern that has gone through the scan process 1033, the filtering process S1500, and the simple thinning S1501 may differ from the color at the time when the second analysis image is printed in the print process 1032 (FIG. 2).

Next, in S1503, the controller 1101 calculates a post-thinning white pixel rate after applying the simple thinning (S1501) according to the white pixel number counted in S1502 mentioned above, and compares the post-thinning white pixel rate with a predetermined threshold Th. The predetermined threshold Th should be close to zero ideally. Alternatively, a rate of the camouflage pixels 2002 in the camouflage image data 1304 may be saved as an initial value of the threshold Th.

Then, when determining that the post-thinning white pixel rate is not less than the predetermined threshold Th ("No" in S1503), the controller 1101 determines that the downsampling has failed, and proceeds with the process to S1504. In S1504, the controller 1101 changes the phase of the sampling pixels, returns the process to S1501, and controls to perform the simple thinning again. For example, the phase corresponding to the sampling pixels 2105 is changed to the phase corresponding to the sampling pixels 2003.

In the meantime, when determining that the post-thinning white pixel rate is less than the threshold Th ("Yes" in S1503), the controller 1101 determines that the downsampling has succeeded, and finishes the downsampling.

The process for removing the camouflage image is not limited to the above-mentioned downsampling process in S1302. An optimal filtering processes or another downsampling process may be employed. Moreover, a sharpness process may be added subsequent to the filtering process (S1500) if needed. Moreover, a process for determining whether the phase of pixels that will be extracted is correct may be added to the simple thinning (S1501). Moreover, when it was determined that the downsampling failed in S1503, the simple thinning (S1501) may be performed after performing a process for interpolating the camouflage pixels 2002 to the analysis image scan data 1305 of 600 dpi.

As mentioned above, the camouflage image is easily removed at the time of downsampling the image by combining the generation of the camouflage image in consideration of the resolution conversion and the downsampling process for dropping resolution according to the first embodiment. This enables to generate the preview image that consists of the first analysis image only and has the sufficient visibility, even though the camouflaged image is used as the second analysis image. Accordingly, when ascertaining the analysis image used at the time of an image diagnosis, the operator is able to ascertain the image (preview image) in which unnecessary images (camouflage image etc.) are not included. This enables the operator to easily visually recognize the image quality problem occurred in the first analysis image. In the meantime, since the second analysis image to be printed is camouflaged, a slight image quality problem becomes difficult to be recognized visually, which reduces a user's superfluous indication about the image quality problem. Since a slight image quality problem becomes difficult to be recognized visually, a user is able to recognize an important image quality problem easily, which facilitates an indication of an important image quality problem while focusing thereon.

Next, a second embodiment of the disclosure will be described. Unlike the first embodiment mentioned above, the second embodiment describes a configuration that switches the camouflage image data 1304 to be composited to the first analysis image according to a situation. Hereinafter, only different portions from the first embodiment will be described and the description of the identical portions will be omitted.

A resolution before downsampling, i.e., a resolution in the scan process 1033 (FIG. 2), is 600 dpi that is the maximum resolution of the image reader 1109 in general in order to analyze an image quality problem with high accuracy. On the other hand, although a resolution after downsampling can be selected from among 300 dpi, 200 dpi, and 100 dpi, it should be noted that relation between size of image data and image quality is trade-off relation. There may be a situation where a user wants to reduce the sizes of the preview image data 1306 and the image data transmitted to the service center as small as possible in consideration of restrictions of the capacity of the storage unit 1108 that stores image data and the traffic of the network 1120 through which image data is transferred. The second embodiment is available even when the resolution after downsampling varies.

Figure 7:
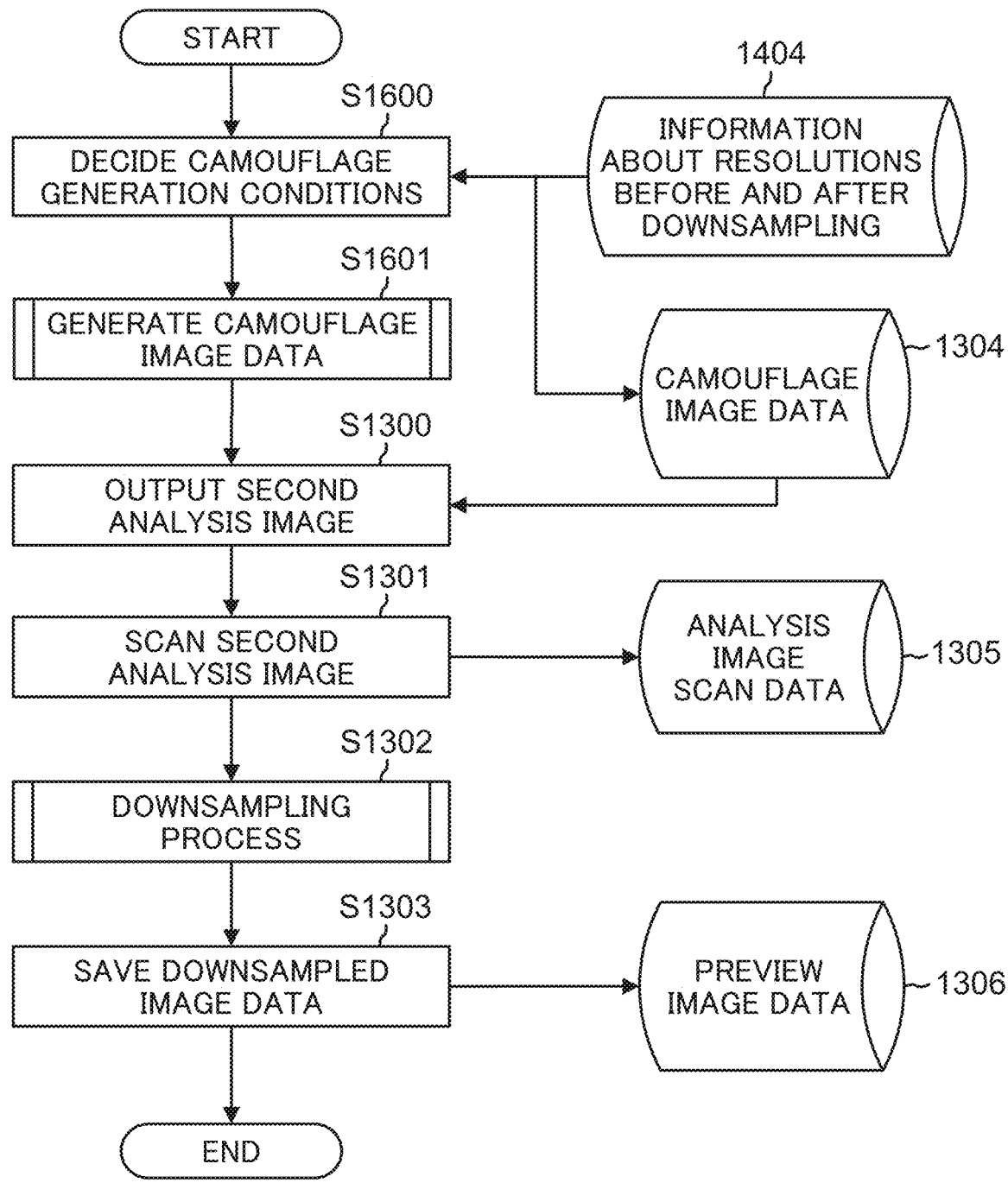
FIG. 7 is a flowchart showing a process procedure of an image forming apparatus according to a second embodiment.

The flow of the process of the second embodiment will be described with reference to FIG. 7. FIG. 7 is a flowchart showing an example of a process procedure of the image forming apparatus 1100 according to the second embodiment. This process corresponds to the flow of the process for generating the camouflage image data 1304 corresponding to the condition of the downsampling process (S1302 in FIG. 4) when the second analysis image is output. The process shown in FIG. 7 is achieved when the CPU 1106 of the image forming apparatus 1100 loads a control program (not shown) stored in the storage unit 1108 to the RAM 1107 and runs it.

In S1600, the controller 1101 decides camouflage generation conditions. The camouflage generation conditions are applied for generating a camouflage image (FIG. 4) and include the resolutions 1404 before and after downsampling and a color of the patterns 1902. As mentioned above, the resolution after downsampling varies in the camouflage generation conditions. A possible method of obtaining the resolution after downsampling is that the controller 1101 receives the image-diagnosis instructing notice 1005 including the information about the resolution sent to the image forming apparatus 1100 from the PC 1111 in the remote maintenance system. Moreover, another possible method is that the UI 1105 of the image forming apparatus 1100 receives the setting of the resolution when the image-diagnosis instructing notice 1005 is sent from the PC 1111 in the remote maintenance system.

Next, in S1601, the controller 1101 generates the camouflage image data 1304 according to the decided camouflage generation conditions through the process in S1400 to S1403 shown in FIG. 5 in the first embodiment, and saves it at the storage unit 1108. The subsequent process is similar to the first embodiment. That is, the controller 1101 outputs the second analysis image (S1300), scans the second analysis image (S1301), performs the downsampling process (S1302), and saves the downsampled image data to the storage unit 1108 as the preview image data 1306 or transmission image data (S1303).

It should be noted that the method for generating the camouflage image by obtaining the resolution after downsampling at the time of outputting the analysis image (S1300) has been described. However, several pieces of the camouflage image data 1304 corresponding to several kinds of resolutions may be beforehand generated according to the camouflage image generation method of the first embodiment, and may be saved to the storage unit 1108. Moreover, camouflage generation conditions other than the resolution may also be changed and reflected.

As mentioned above, according to the second embodiment, it becomes available to generate the preview image data 1306 and transmission image data corresponding to the environment of the image forming apparatus 1100 that undergoes the image diagnosis by generating the camouflage image data 1304 corresponding to the resolution after downsampling.

Next, a third embodiment of the disclosure will be described. Unlike the first embodiment mentioned above, the third embodiment describes a configuration that switches the camouflage image data 1304 to be composited to the first analysis image according to a situation. Hereinafter, only different portions from the first embodiment will be described and the description of the identical portions will be omitted.

The third embodiment describes the configuration that does not perform the downsampling process (S1302) but removes the camouflage image data from the analysis image scan data 1305 obtained in the scan process (1033 in FIG. 2). However, the downsampling process may be performed after removing the camouflage image data.

Figure 8:
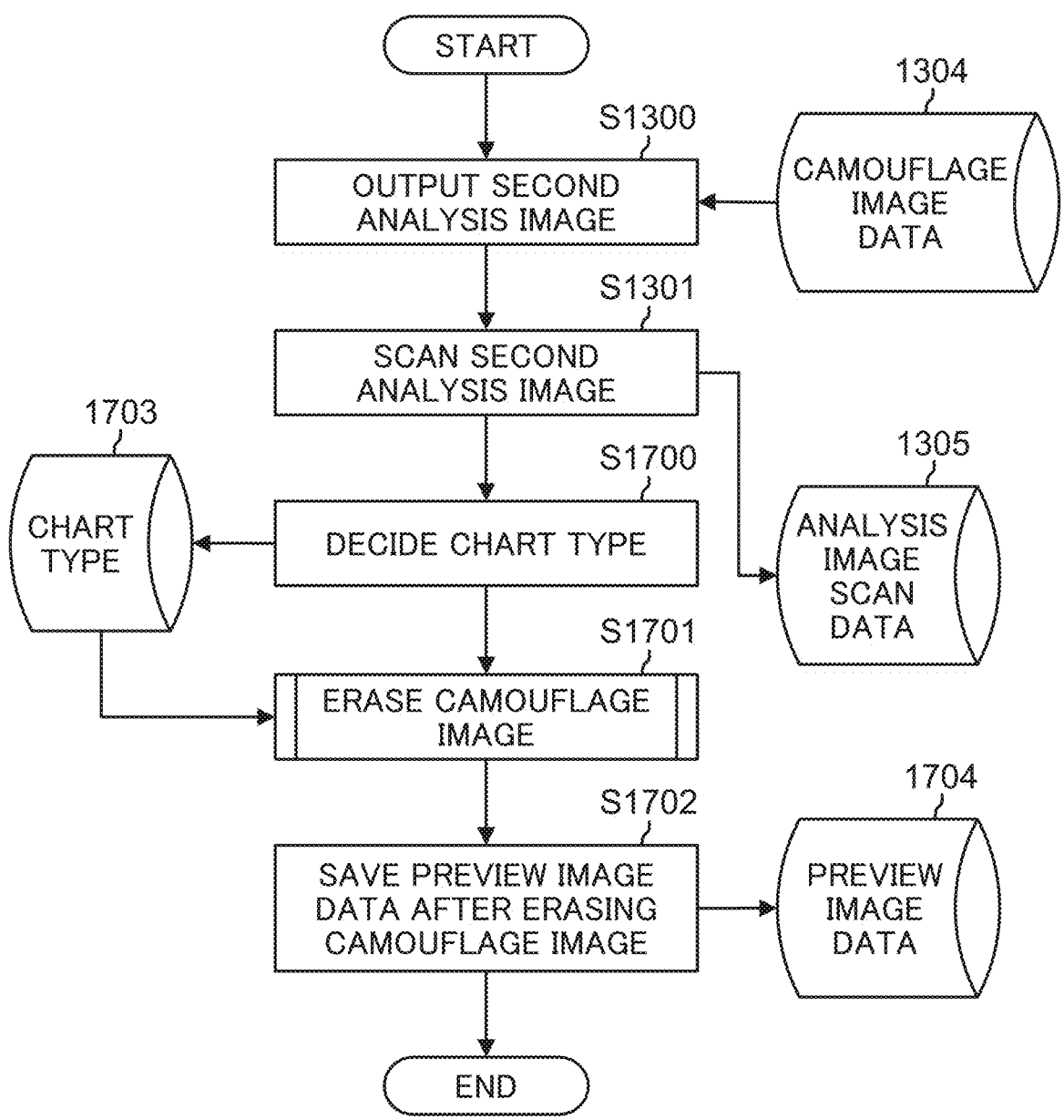
FIG. 8 is a flowchart showing a process procedure of an image forming apparatus according to a third embodiment.
Figure 9:
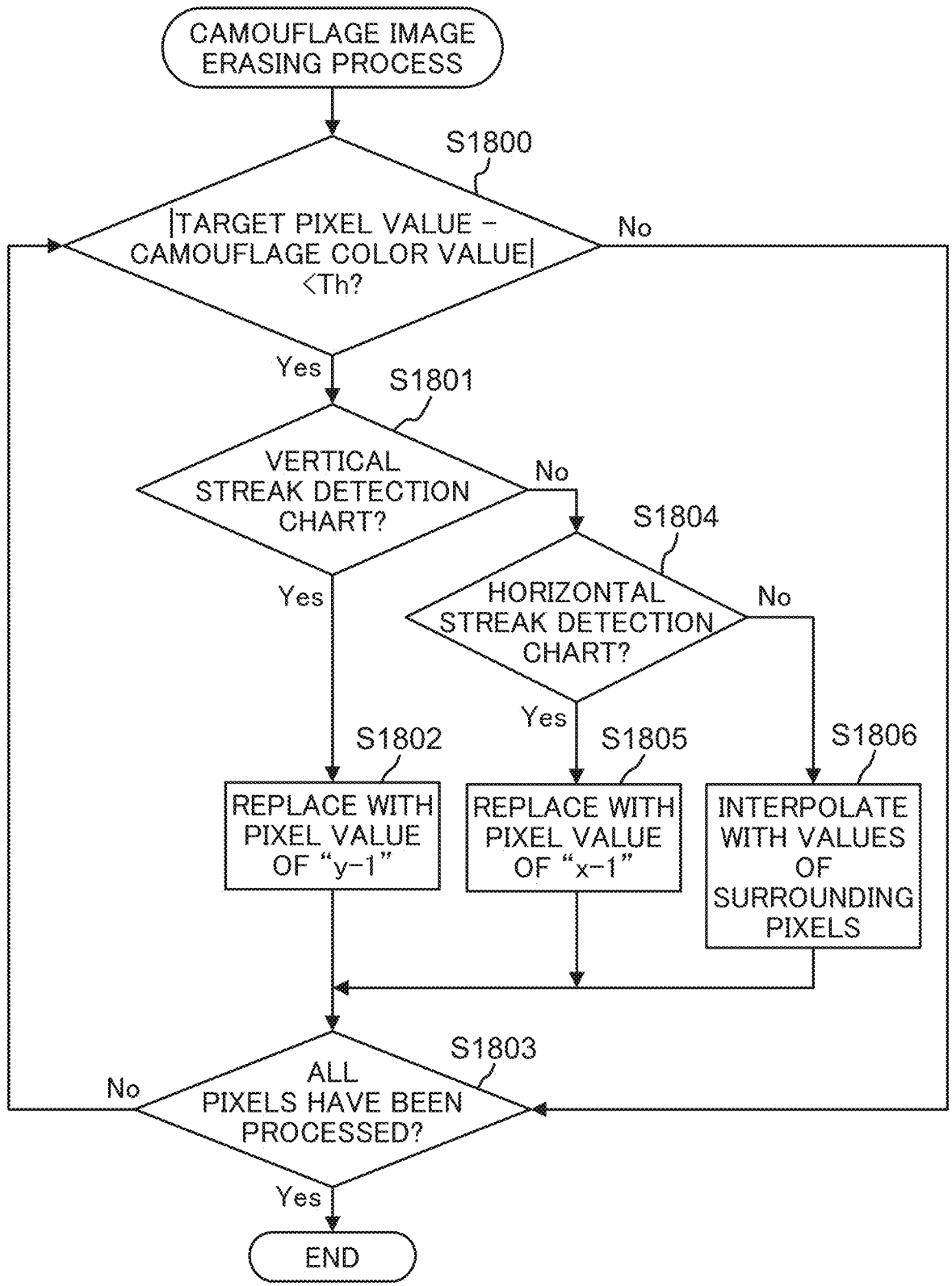
FIG. 9 is a flowchart showing an example of a procedure of a camouflage erasing process according to the third embodiment.

The flow of the process of the third embodiment will be described with reference to FIG. 8. FIG. 8 is a flowchart showing an example of a process procedure of the image forming apparatus 1100 according to the third embodiment. The process shown in FIG. 8 and a below-mentioned process shown in FIG. 9 are achieved when the CPU 1106 of the image forming apparatus 1100 loads a control program (not shown) stored in the storage unit 1108 to the RAM 1107 and runs it.

In the third embodiment, the controller 1101 outputs the second analysis image (S1300), scans the second analysis image (S1301), and saves the analysis image scan data 1305 to the storage unit 1108, as with the first embodiment. The camouflage image data 1304 composited to the first analysis image data in the time of outputting the second analysis image (S1300) may be generated by the method of the first embodiment or another method. The camouflage image data 1304 is generated so as to secure a sufficient analytic area when the remote maintenance system performs the image analysis process 1009 (FIG. 2).

In S1700, the controller 1101 decides a type of the analysis image scan data 1305 from which the patterns 1902 will be removed, and saves it to the storage unit 1108 as information about a chart type 1703. The types of the analysis image scan data 1305 are the first analysis image 1201 for detecting a vertical streak and the first analysis image 1208 for detecting a lateral streak, for example. There may be a first analysis image for detecting a different image quality problem.

The chart type may be decided (S1700) by detecting a mark, such as a chart serial number or a QR Code (registered trademark), that is attached to the second analysis image. Moreover, the chart type may be determined from a feature amount, such as histogram of the pixel values of the analysis image scan data 1305 or a thumbnail image created separately.

Next, in S1701, the controller 1101 reads the information about the chart type 1703 saved in the storage unit 1108 and erases the camouflage image. The details of erasing the camouflage image (S1701) will be described with reference to FIG. 13A through FIG. 13J mentioned later. Next, in S1702, the controller 1101 saves the image data that the camouflage image has been erased to the storage unit 1108 as the preview image data 1704 or the transmission image data.

FIG. 13A through FIG. 13J are schematic views showing stages of erasing the camouflage image (S1701) according to the third embodiment. In FIG. 13A through FIG. 13J, a coordinate using an alphabet and a number is given to each pixel for description.

FIG. 13A is a schematic view showing a pre-erasure image 2200 before erasing the camouflage image from the second analysis image 1201 including the vertical streak detection chart. In the pre-erasure image 2200, black pixels are pixels of a normal first analysis image. Moreover, a vertical streak appears in the columns "d" and "e". Moreover, white pixels are the camouflage pixels 2002.

FIG. 13B through FIG. 13D are schematic views showing states during erasure of the camouflage image from the pre-erasure image 2200, and show during-erasure images 2201, 2202, and 2203. Moreover, FIG. 13E is a schematic view showing a post-erasure image 2204 after erasing the camouflage image from the pre-erasure image 2200.

In the same manner, FIG. 13F is a schematic view showing a pre-erasure image 2205 before erasing the camouflage image from the second analysis image 1208 including the horizontal streak detection chart. In the pre-erasure image 2205, black pixels are pixels of a normal first analysis image. Moreover, a horizontal streak appears in lines "3" and "4". Moreover, white pixels are the camouflage pixels 2002.

FIG. 13G through FIG. 13I are schematic views showing states during erasure of the camouflage image from the pre-erasure image 2205, and show during-erasure images 2206, 2207, and 2208. FIG. 13J is a schematic view showing a post-erasure image 2209 after erasing the camouflage image from the pre-erasure image 2205.

The camouflage image erasing process (S1701) in FIG. 8 will be described with reference to FIG. 9. FIG. 9 is a flowchart showing an example of the camouflage image erasing process according to the third embodiment. The camouflage image erasing process (S1701) shown in FIG. 8 is achieved when the controller 1101 scans the pixels in the image from a1 to h9 and determines whether a target pixel is the camouflage pixel 2002 for every pixel. Then, when the target pixel is the camouflage pixel 2002, the process for interpolating the signal value of the target pixel is performed. In the description, each of the pre-erasure images 2200 and 2205 shall be an eight-bit gray scale image that is obtained by extracting a specific color plane from the second analysis image.

In S1800, the controller 1101 first determines whether the target pixel is the camouflage pixel 2002 by determining whether difference between a target pixel value and a camouflage color value is smaller than a predetermined threshold (Th). The color value of a white camouflage pixel of the gray scale image becomes "255". However, even if a color value of a target pixel is "255" on electronic image data, a color value of the target pixel may not become "255" after the scan process (1033 in FIG. 2) because the color of a paper sheet is affected. Accordingly, the difference of the target pixel value and the camouflage color value is permitted. For example, the threshold Th is equal to about "30".

When determining that the difference between the target pixel value and the camouflage color value is not less than the threshold Th ("No" in S1800), the controller 1101 proceeds with the process to S1803.

In the meantime, when determining that the difference between the target pixel value and the camouflage color value is less than the threshold Th ("Yes" in S1800), the controller 1101 proceeds with the process to S1801. In the example in FIG. 13A, the pixel c2 of the pre-erasure image 2200 is first determined as the camouflage pixel 2002.

In S1801, the controller 1101 determines whether the pre-erasure image 2200 is the second analysis image 1201 including the vertical streak detection chart. It is not necessary to determine the chart type 1703 every time when the pixel is determined as the camouflage pixel 2002. When the controller 1101 reads beforehand the chart type 1703 saved in the storage unit 1108 and saves it to the RAM 1107 before the camouflage erasing process (S1701), the chart type 1703 is fixed while processing the same image.

When it is determined that the pre-erasure image 2200 is the second analysis image 1201 including the vertical streak detection chart ("Yes" in S1801), the controller 1101 proceeds with the process to S1802. In S1802, the controller 1101 replaces the value of the target pixel with the pixel value of "y−1" and proceeds with the process to S1803. For example, the pixel c2 is replaced with the value of the pixel c1. Thereby, the camouflage pixel 2002 is interpolated and the during-erasure image 2201 is obtained.

In the meantime, when it is determined that the pre-erasure image 2200 is not the second analysis image 1201 including the vertical streak detection chart ("No" in S1801), the controller 1101 proceeds with the process to S1804. In S1804, the controller 1101 determines whether the pre-erasure image 2200 is the second analysis image 1208 including the horizontal streak detection chart. When it is determined that the pre-erasure image 2200 is the second analysis image 1208 including the horizontal streak detection chart ("Yes" in S1804), the controller 1101 proceeds with the process to S1805. In S1805, the controller 1101 replaces the value of the target pixel with the pixel value of "x−1" and proceeds with the process to S1803. For example, the pixel b3 is replaced with the value of the pixel a3. Thereby, the camouflage pixel 2005 is interpolated and the during-erasure image 2206 is obtained.

In the meantime, when it is determined that the pre-erasure image 2200 is not the second analysis image 1208 including the horizontal streak detection chart ("No" in S1804), the controller 1101 proceeds with the process to S1806. In S1806, the controller 1101 replaces the value of the target pixel with the average of the values of the surrounding pixels, interpolates the camouflage pixel 2002, and proceeds with the process to S1803. Alternatively, the camouflage pixel 2002 may be interpolated by preparing an interpolation method suitable to another chart type 1703. Otherwise, the process may proceed to S1803 without performing any process. Since the image obtained by the scan process 1034 (FIG. 2) is an RGB image, the above description used an RGB value. However, the image may be processed by converting to other color spaces, such as CMYK and L*a*b*, after the image scan 1008 (FIG. 2).

In S1803, the controller 1101 determines whether all the pixels have been processed. When determining that there is a pixel that has not been processed ("No" in S1803), the controller 1101 returns the process to S1800 and shifts to the process for the following pixel.

When the second analysis image includes the vertical streak detection chart, the pixel d2 is replaced with the value of the pixel d1 and the during-erasure image 2202 is obtained by repeating the process. Furthermore, the pixel c3 is replaced with the value of the pixel c2 and the during-erasure image 2203 is obtained. Finally, the post-erasure image 2204 is obtained. When the second analysis image includes the horizontal streak detection chart, the pixel c3 is replaced with the value of the pixel b3 and the during-erasure image 2207 is obtained by repeating the process. Furthermore, the pixel d3 is replaced with the value of the pixel c3 and the during-erasure image 2208 is obtained. Finally, the post-erasure image 2209 is obtained.

Then, when it is determined that all the pixels have been processed ("Yes" in S1803), the controller 1101 finishes the process of this flowchart.

As mentioned above, the third embodiment enables to generate the image from which the camouflage image is removed without erasing the characteristic feature of the image quality problem by interpolating the camouflage pixels by the interpolation method corresponding to the chart type of the first analysis image.

Accordingly, although the camouflaged image is used as the second analysis image according to the embodiments, the operator is able to ascertain the preview image in which an unnecessary camouflage image is not included at the time of the image diagnosis. This enables the operator to facilitate visual recognition of an image quality problem in an analysis image. In the meantime, since the second analysis image to print is camouflaged, a slight image quality problem becomes difficult to recognize visually, which prevents an indication of a superfluous image quality problem from a user. Since a slight image quality problem becomes difficult to be recognized visually, a user is able to recognize an important image quality problem easily, which facilitates an indication of an important image quality problem while focusing thereon. Accordingly, the preview image that an operator ascertains becomes easy to recognize an image defect visually. And a superfluous indication by a user is prevented by making the analysis image to print be difficult to recognize an image defect visually.

It should be noted that the first and second embodiments may be configured to determine a type of an analysis image and to downsample according to the determined type.

It should be noted that the configurations and contents of the data are not limited to the embodiments. They are configured by various configurations and contents dependent on applications or objects thereof.

Up to this, the embodiments have been described. The aspect of the embodiments can be embodied as a system, an apparatus, a method, a program, a storage medium, etc. Specifically, the aspect of the embodiments can be applied to a system that consists of a plurality of devices, or to an apparatus that consists of a single device. Moreover, the disclosure includes a configuration that combines the above-mentioned embodiments.

Moreover, the aspect of the embodiments may be applied to a system that consists of a plurality of apparatuses or a system that consists of a single apparatus. The disclosure is not limited to the above-mentioned embodiments. Various modulations (including an organic combination of the embodiments) are possible on the basis of the gist of the disclosure, and they are not excepted from the scope of the disclosure. That is, all the configurations that combine the embodiments mentioned above and their modified examples are also included in the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-228942, filed Nov. 29, 2017, which is hereby incorporated by reference herein in its entirety.

What is claimed is:

1. An apparatus comprising:
one or more processors; and
a memory coupled to the one or more processors, the memory having instructions that, when executed by the processors, perform operations as:
a forming unit configured to form an image on a sheet;
a reading unit configured to read image data from an original;
an output processing unit configured to output a second image that is obtained by adding an image pattern to a first image for an image diagnosis to the sheet;
a read processing unit configured to read the sheet on which the second image is output and to generate first image data;
and
a generating unit configured to generate second image data that is displayed for the image diagnosis by erasing the image pattern from the first image data through converting resolution of the first image data into low resolution,
wherein the image pattern is image data in which block areas are arranged cyclically, and
wherein arrangement intervals of the block areas of the image pattern to be added are decided based on resolutions before and after converting resolution of the first image data.

2. The apparatus according to claim 1, wherein the generating unit generates the second image data by downsampling the first image data, and
wherein the image pattern includes of pixels that are not extracted by downsampling.

3. The apparatus according to claim 1, wherein size of the block areas is decided based on resolutions before and after changing resolution of the first image data.

4. The apparatus according to claim 2, wherein simple thinning is applied to the first image data by the downsampling.

5. The apparatus according to claim 4, wherein the generating unit counts pixels of a predetermined signal value in the image data after the simple thinning, determines whether the downsampling has succeeded based on a result of the counting, and downsamples again after changing pixels downsampled when it is determined that the downsampling has not succeeded.

6. The apparatus according to claim 2, further comprising:
an addition unit configured to add the image pattern to the first image,
wherein the generating unit generates the image pattern based on resolutions before and after downsampling.

7. The apparatus according to claim 2, wherein the generating unit determines a type of the first image data and downsamples according to the determined type.

8. The apparatus according to claim 1, wherein the generating unit erases the image pattern from the first image data by interpolating a target pixel corresponding to the image pattern with a pixel value around the target pixel.

9. The apparatus according to claim 1, further comprising a transmission unit configured to transmit the second image data in order to display on an information processing apparatus through a communication medium.

10. The apparatus according to claim 9, wherein the output processing unit outputs the second image in response to an instruction sent from the information processing apparatus.

11. A method for an apparatus having a forming unit that forms an image on a sheet and a reading unit that reads image data from an original, the method comprising:
   outputting a second image that is obtained by adding a image pattern to a first image for an image diagnosis to the sheet;
   reading the sheet on which the second analysis image is output and of generating first image data;
   and
   generating second image data that is displayed for the image diagnosis by erasing the image pattern from the first image data through converting resolution of the first image data into low resolution,
   wherein the image pattern is image data in which block areas are arranged cyclically, and
   wherein arrangement intervals of the block areas of the image pattern to be added are decided based on resolutions before and after changing resolution of the first image data.

12. The method according to claim 11,
   wherein the generating generates the second image data by downsampling the first image data, and
   wherein the image pattern includes of pixels that are not extracted by downsampling.

13. The method according to claim 11, wherein the erasing erases the image pattern from the first image data by interpolating a target pixel corresponding to the image pattern with a pixel value around the target pixel.

14. The method according to claim 11, further comprising transmitting the second image data in order to display on an information processing apparatus through a communication medium.

15. A non-transitory computer-readable storage medium storing a program causing a computer to execute a method for an apparatus having a forming unit that forms an image on a sheet and a reading unit that reads image data from an original, the method comprising:
   outputting a second image that is obtained by adding a image pattern to a first image for an image diagnosis to the sheet;
   reading the sheet on which the second image is output and of generating first image data;
   and
   generating second image data that is displayed for the image diagnosis by erasing the image pattern from the first image data through converting resolution of the first image data into low resolution,
   wherein the image pattern is image data in which block areas are arranged cyclically, and
   wherein arrangement intervals of the block areas of the image pattern to be added are decided based on resolutions before and after changing resolution of the first image data.

16. The non-transitory computer-readable storage medium according to claim 15,
   wherein the generating generates the second image data by downsampling the first image data, and
   wherein the image pattern includes of pixels that are not extracted by downsampling.

17. The non-transitory computer-readable storage medium according to claim 15, wherein the erasing erases the image pattern from the first image data by interpolating a target pixel corresponding to the image pattern with a pixel value around the target pixel.

18. The non-transitory computer-readable storage medium according to claim 15, further comprising transmitting the second image data in order to display on an information processing apparatus through a communication medium.

* * * * *